Dec. 8, 1925.   1,564,597
C. C. P. LUND
HORSESHOE PITCHING GAME
Filed Aug. 25, 1925
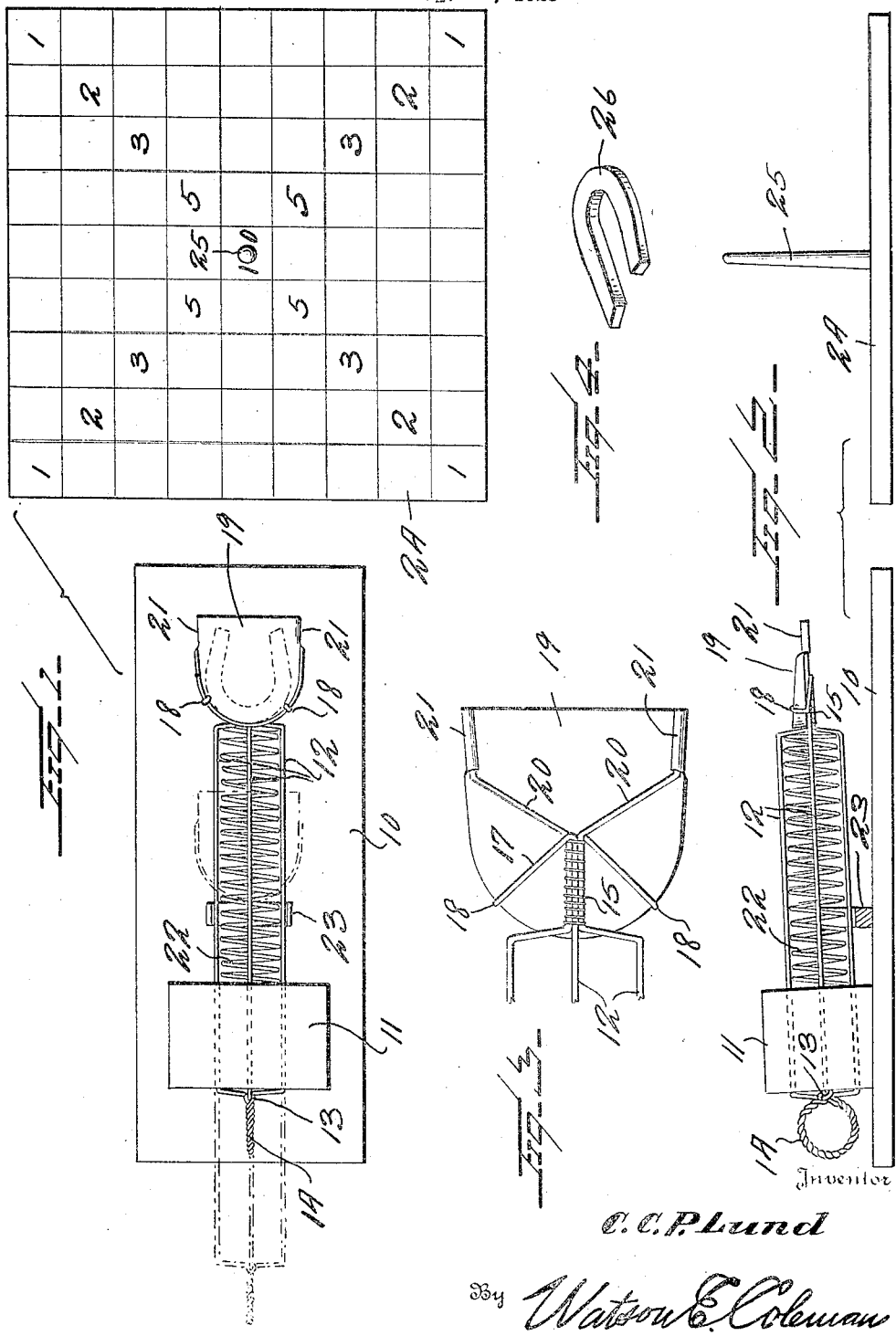

Patented Dec. 8, 1925.

1,564,597

UNITED STATES PATENT OFFICE.

CARL C. P. LUND, OF OAKFIELD, WISCONSIN.

HORSESHOE-PITCHING GAME.

Application filed August 25, 1925. Serial No. 52,428.

*To all whom it may concern:*

Be it known that I, CARL C. P. LUND, a citizen of the United States, residing at Oakfield, in the county of Fond du Lac and State of Wisconsin, have invented certain new and useful Improvements in Horseshoe-Pitching Games, of which the following is a specification, reference being had to the accompanying drawings.

This invention relates to toys and games, and particularly to a horseshoe pitching game.

The general object of the invention is to provide a very simple device of this kind including a projector, miniature horseshoes adapted to be projected therefrom, and a plate adapted to rest upon the ground and having a pin, the object of the game being to project the horseshoe into as near proximity to the pin as possible and, if possible, cause the horseshoes to encircle the pin.

A further object is to provide a projector for the horseshoes including a shank portion carrying a horseshoe supporting plate at its extremity, and a spring mounted within the shank portion and adapted to be compressed when the shank is retracted and when expanded to project the horseshoes toward the pin.

My invention is illustrated in the accompanying drawing, wherein:—

Figure 1 is a top plan view of a game constructed in accordance with my invention showing in dotted lines the horseshoe projector retracted;

Figure 2 is a side elevation of the structure shown in Figure 1;

Figure 3 is an under side plan view of the horseshoe support;

Figure 4 is a perspective view of the horseshoe.

Referring to this drawing, it will be seen the projector comprises a base or plate 10 having a support 11 disposed thereon. Extending through this support are four rods or wires 12, these rods or wires being brought together at their rear ends, as at 13, and formed to provide the finger loop 14. The four rods or wires are equally spaced and at their forward ends are brought together, as at 15. Two of the wires extend rearwardly and laterally, as at 17, and are formed with hooks 18, while the other two wires are extended laterally and then forwardly.

Supported upon these four wires is a plate 19 constituting a horseshoe support and preferably having in plan the general form of a horseshoe and having an upwardly turned rear margin or flange which extends around the sides of the plate. The hooks 18 engage over this flange, while the laterally and then forwardly extending wires 20 are engaged with the forward margin of the plate by turning over the edges of the plate, as at 21. I do not wish to be limited to this particular means of holding this plate upon the forward end of the shank.

Disposed within the shank is a coiled compression spring 22, which at its forward ends bears against the convergent ends of the four rods or wires 12 and at its rear end bears against the support 11. One or more guide members 23 may be disposed along the length of the shank to support and guide the same and prevent any tendency of the shank to drop or sag.

As a target to which the horeshoes are to be projected, I provide a plate 24 having a centrally disposed pin 25, this plate being marked off in circles or squares, those squares or circles nearest the pin being given the highest numbers, while those circles or squares relatively removed from the plate are given low numbers. The horseshoes 26 are miniature horseshoes which may be made of relatively light metal or any suitable material and are adapted to be projected by the projector as near as possible to the pin 25.

In the use of this device, a player disposes a horseshoe upon the plate 19 and retracts the shank, thereby compressing the spring 22. He then releases the shank, whereupon the horseshoe is projected toward the pin, and if it is skillfully projected will land on the plate 24 adjacent the pin or will "ring" the pin just as in the ordinary horseshoe pitching game.

While I have illustrated a particular form of my projector, I do not wish to be limited thereto as this might be changed in many ways without departing from the spirit of the invention. In the actual manufacture of this device, the parts will be of metal and formed by punch and press work.

I claim:—

1. A game apparatus of the character described including a base, a supporting member mounted upon the base, a skeletonic shank extending through the supporting member and having a handle at its rear end whereby it may be retracted, a spring disposed within the hollow shank bearing at one end against the shank and at the other end against the supporting member and urging the shank outward, and a piece supporting plate mounted upon the forward extremity of the shank and having an upturned flange at its rear end and open at its front end.

2. A game apparatus of the character described including a base, a supporting member mounted thereon, a plurality of longitudinally extending rods constituting a shank and extending through the supporting member, the rods at their rear ends being joined to a handle, a spring disposed within the rods, the spring bearing against the supporting member at one end and against the forward end of the shank at the other, and a piece supporting plate mounted upon the forward end of the shank, the piece supporting plate having a flange at its rear end.

3. A game apparatus of the character described including a base, a supporting member mounted thereon, a shank formed of four longitudinally extending, parallel, spaced rods extending through the supporting member and conjoined to form a handle at their rear ends, the forward ends of said rods being extended divergently in different directions, a piece supporting plate mounted upon the divergent ends of the rods and having a rear flange, and a spring disposed within the rods bearing at its forward end against the forward end of the rod and at its rear end bearing against the supporting member.

4. A game apparatus of the character described including a base, a supporting member mounted thereon, a shank formed of four longitudinally extending, parallel, spaced rods extending through the supporting member and conjoined to form a handle at their rear ends, the forward ends of said rods being extended divergently in different directions, a piece supporting plate mounted upon the divergent ends of the rods and having a rear flange, and a spring disposed within the rods bearing at its forward end against the forward end of the rods and at its rear end bearing against the supporting member, two of the rods being extended rearwardly and laterally of said plate and hooked over the rear flange, the other two rods extending laterally and forwardly and being engaged with the lateral margins of the forward end of the supporting plate.

5. A game apparatus of the character described including a plate having a central pin, pieces adapted to be projected toward the pin and having the form of horseshoes, a projector for said pieces comprising a base, a supporting member mounted thereon, a shank manually retractable through the supporting member, a spring projecting said shank away from the supporting member, and a plate carried upon the extremity of the shank and having a rear flange and open at the front whereby the horseshoe may be projected from the plate.

In testimony whereof I hereunto affix my signature.

CARL C. P. LUND.